United States Patent Office 3,398,017
Patented Aug. 20, 1968

3,398,017
WATER REPELLENT TREATMENT
Thomas S. Baurain and George J. Quaal, Midland, Mich., assignors to Dow Corning Corporation, Midland, Mich., a corporation of Michigan
No Drawing. Filed Sept. 14, 1964, Ser. No. 396,346
19 Claims. (Cl. 117—123)

ABSTRACT OF THE DISCLOSURE

An improved process for rendering substrates water repellent, particularly masonry and fibrous substrates, is disclosed. The improvement comprises using polymers of certain acryloxy functional organosilicon compounds as the water repellent agent.

---

This invention relates to an improvement in a process of treating substrates to render them water repellent.

More specifically, this invention relates to an improvement in a process of treating a substrate to render it water repellent, the improvement comprising employing a polymer of a compound of the formula

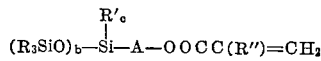
$$(R_3SiO)_b-Si-A-OOCC(R'')=CH_2$$

wherein R is a member selected from the group consisting of the hydrogen atom, methyl, ethyl, vinyl and 3,3,3-trifluoropropyl radicals, $b$ is an integer from 2–3, R' is a member selected from the group consisting of the hydrogen atom, monovalent hydrocarbon radicals and fluorinated monovalent hydrocarbon radicals, there being no more than 12 carbon atoms in R' and any fluorine atoms that are present are on at least the third carbon atom removed from the silicon atom when the radical is a saturated aliphatic radical, $c$ is an integer from 0 to 1, $b+c$ is 3, A is an alkylene radical containing from 1–8 carbon atoms, and R'' is a member selected from the group consisting of the hydrogen atom, methyl and ethyl radicals, as the water repellent treating agent.

The compounds used to prepare the water repellent agent of this invention are best made, so far as is known at this time, by cohydrolysis and condensation of

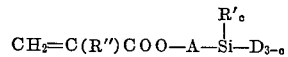
$$CH_2=C(R'')COO-A-Si-D_{3-c}$$

and an excess of R₃SiSD. A mixture of the two aforementioned silanes is preferably added to a water-solvent mixture with agitation.

D in the above formulae represents a hydrolyzable group such as an alkoxy or acyloxy group or a halogen atom. Specific examples of D include the methoxy, ethoxy, propoxy, isopropoxy, butoxy, formyloxy, acetoxy, propionoxy, —OCH₂CH₂OCH₃, —OCH₂CH₂OC₂H₅ and —OCH₂CH₂OH groups and the chlorine, bromine and iodine atoms. Preferably, D is a methoxy group or a chlorine atom.

The amount of water employed in the hydrolysis of the silanes is not particularly critical except that enough should be used for the reaction to proceed at a satisfactory rate.

While the use of a solvent is not essential to the preparation of the compounds, it is desirable to employ one in order to obtain a low reflux temperature, to improve the solubility of the product and to help separate the product from any hydrohalic acid that may be produced by the hydrolysis. Ether is a particularly useful solvent for the reaction, but any other suitable solvent can be used. For example, heptane, carbon tetrachloride and benzene can also be used.

Upon completion of the reaction, the product can be separated from the water, solvent and by-products by conventional means.

The polymers used as water repellent agents are prepared by polymerizing the unsaturated tail of the above compounds by conventional means. These polymers are useful for treating substrates, particularly masonry and fibrous substrates, to render them water repellent. These polymers have excellent utility where initial water repellency is important. Specific examples of such uses are disposable surgical papers, nurses uniforms, fiber packs for material (particularly chemical) shipping and storage, and shipping cartons and bags generally. These water repellents can be applied to the substrates by the usual techniques, i.e., from solvents or emulsions.

In order that those skilled in the art may better understand how the present invention can be practiced, the following examples are given by way of illustration and not by way of limitation.

EXAMPLE 1

To a three-necked 5000 ml. flask equipped with a stirrer, a reflux condenser and a dropping funnel there was added 512 ml. of water and 500 ml. of ether. A mixture of 248 g. of

$$CH_2=C(CH_3)COO(CH_2)_3Si(OCH_3)_3$$

325.5 g. of (CH₃)₃SiCl and 312 g. of (CH₃)₃SiOCH₃ was placed in the dropping funnel. The stirrer was started and then addition of the mixture to the water and ether started. The rate of addition was about 8.9 g. per minute. At the end of the addition, the temperature of the material in the flask had risen to about 50° C. The reactants were allowed to stir overnight. The following day the water was removed from the mixture in the flask employing a separatory funnel and then the remainder of the contents of the flask were washed four times with water to remove the HCl produced by the reaction. The ether was then separated under vacuum from the crude product by passing the crude material through a Buechner funnel on a suction flask. About 600–700 ml. of crude product remained. This crude material was placed in a one liter pot and distilled under vacuum. About 194 ml. of

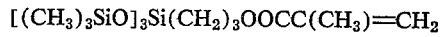
$$[(CH_3)_3SiO]_3Si(CH_2)_3OOCC(CH_3)=CH_2$$

was obtained at 112° to 115° C. and 0.2 mm. of mercury pressure. Analysis of the product for percentage composition was in agreement with its formula and as follows: Theoretical: Si, 26.5%; C, 45.5%; H, 9.0%. Found: Si, 26.39 and 26.27%; C, 45.63 and 45.65%; H, 9.00 and 8.78%.

EXAMPLE 2

The procedure of Example 1 was repeated except a mixture of 248 g. of

$$CH_2=C(CH_3)COO(CH_2)_3Si(OCH_3)_3$$

and 517 g. of H(CH₃)₂SiCl was placed in the dropping funnel. The rate of addition was about 9 g. per minute. At the end of the addition the temperature of the materials in the flask had risen to about 45° C. Stirring was continued until the pot cooled to 27° C., then the water removed and the remaining mixture washed four times with water to remove all the HCl formed. The ether was then removed as before. The crude material was placed in a one liter pot and distilled under vacuum employing a Vigreaux column. About 129 ml. of $$[H(CH_3)_2SiO]_3Si(CH_2)_3OOCC(CH_3)=CH_2$$

was obtained at about 115° C. and 0.1 mm. of mercury pressure.

EXAMPLE 3

A mixture of 62 g. of $$CH_2=C(CH_3)COO(CH_2)_3Si(OCH_3)_2CH_3$$

58 g. of $CH_2=C(CH_3)COO(CH_2)_3SiCl_2CH_3$ and 218 g. of $(CH_3)_3SiCl$ were placed in a flask and then 132 g. of isopropyl alcohol added to the mixture. The resulting mixture was stirred for several minutes and then poured over 200 g. of crushed ice. The water layer was separated and then the crude product washed a couple of times with water and then washed with sodium bicarbonate solution until neutral. The crude mixture was distilled from a trace of sulfur. About 86 g. of $$[(CH_3)_3SiO]_2\underset{\underset{CH_3}{|}}{Si}(CH_2)_3OOCC(CH_3)=CH_2$$

was produced. The product has a boiling point of 110° to 115° C. at 1 mm. of mercury pressure.

EXAMPLE 4

A mixture of 8 g. of $$[(CH_3)_3SiO]_3Si(CH_2)_3OOCC(CH_3)=CH_2$$

8 g. of benzene and 0.04 g. of Vazo initiator (azobisisobutyronitrile) was placed in a 20 ml. vial, capped and then placed in a 50°–60° steam bath oven for about 12 hours when polymerization was complete.

Cotton print cloth (80 x 80) was padded on a Butterworth Laboratory Padder with a solution consisting of 120 ml. of perchloroethylene, 7 g. of the polymer solution prepared above and 0.5 g. of a curing catalyst $H_2NCH_2CH_2NH(CH_2)_3Si(OCH_3)_3$ so that a 1.5–2% pickup of polymer solids was obtained. After padding, the cloth was air dried and then cured at about 150° C. for three minutes. The cloth was then spray tested for water repellency using AATCC Test No. 22–1961. The cloth had an initial spray rating of 100, the highest possible rating.

The above procedure was repeated except that the silanes of Examples 2 and 3 were used instead of the silane of Example 1. The cloths treated with polymers of these materials both had initial spray ratings of 80.

EXAMPLE 5

To a one gallon jug there was added 1600 ml. of perchloroethylene, 16 ml. of a commercial dry cleaning soap and a water repellent cloth as treated in Example 4 which had a spray rating of 100. The jug and its contents were then tumbled endwise at 60 r.p.m. for 30 minutes. The cloth was then removed from the jug, the dry cleaning fluid extracted by centrifugal force, and the dry cloth again tested for water repellency as before. The cloth was now found to have a spray rating of 70. This example shows that the water repellent treatment of this invention tends to be durable to dry cleaning which simulates commercial dry cleaning.

EXAMPLE 6

When polymers of the compounds specified below are used as water repellents following the procedure of Example 4, equivalent results are obtained:

$$[(CH_3)_3SiO]_3Si(CH_2)_3OOCCH=CH_2$$
$$[(C_2H_5)_3SiO]_3Si(CH_2)_3OOCC(C_2H_5)=CH_2$$
$$[CH_2=CH(CH_3)_2SiO]_3SiCH_2CH(CH_3)$$
$$\qquad CH_2OOCC(CH_3)=CH_2$$
$$[CF_3CH_2CH_2(CH_3)_2SiO]_3Si(CH_2)_3OOCC(CH_3)=CH_2$$
$$[(CH_3)_3SiO]_3Si(CH_2)_4OOCCH=CH_2$$
$$[H(C_2H_5)_2SiO]_3Si(CH_2)_6OOCC(CH_3)=CH_2$$
$$[CH_2=CH(CH_3)_2SiO]_3Si(CH_2)_3OOCC(CH_3)=CH_2$$
$$[H(CH_3)_2SiO]_3Si(CH_2)_3OOCCH=CH_2$$

$$[H(CH_3)_2SiO]_2\underset{\underset{CH_3}{|}}{Si}(CH_2)_3OOCC(CH_3)=CH_2$$

$$[CF_3CH_2CH_2(CH_3)_2SiO]_2\underset{\underset{CH_2CH_2CF_3}{|}}{Si}(CH_2)_3OOCC(CH_3)=CH_2$$

$$[CF_3CH_2CH_2(CH_3)_2SiO]_3Si(CH_2)_3OOCCH=CH_2$$

$$[(CH_3)_3SiO]_2\underset{\underset{CH_3}{|}}{Si}(CH_2)_3OOCCH=CH_2$$

$$[CF_3CH_2CH_2(CH_3)_2SiO]_2\underset{\underset{CH_2CH_2CF_3}{|}}{Si}(CH_2)_3OOCCH=CH_2$$

EXAMPLE 7

When solutions of any of the polymers of the previous examples are applied to brick or cement block structures and the solvent allowed to evaporate, the structure becomes water repellent.

That which is claimed is:

1. In a process of treating a substrate to render it water repellent, the improvement comprising employing a solution or emulsion containing a polymer prepared by polymerizing the unsaturated tail of a compound of the formula $$(R_3SiO)_b-\underset{\underset{R_c}{|}}{\overset{\overset{R'_c}{|}}{Si}}-A-OOCC(R'')=CH_2$$

wherein R is a member selected from the group consisting of the hydrogen atom, methyl, ethyl, vinyl and 3,3,3-trifluoropropyl radicals, $b$ is an integer from 2–3, R' is a member selected from the group consisting of the hydrogen atom, monovalent hydrocarbon radicals and fluorinated monovalent hydrocarbon radicals, there being no more than 12 carbon atoms in R' and any fluorine atoms that are present are on at least the third carbon atom removed from the silicon atom when the radical is a saturated aliphatic radical, $c$ is an integer from 0–1, $b+c$ is 3, A is an alkylene radical containing from 1–8 carbon atoms, and R'' is a member selected from the group consisting of the hydrogen atom, methyl and ethyl radicals, as the water repellent treating agent.

2. The process of claim 1 wherein the substrate is a masonry substrate.

3. The process of claim 2 wherein the compound is $[(CH_3)_3SiO]_3Si(CH_2)_3OOCC(CH_3)=CH_2$.

4. The process of claim 2 wherein the compound is $[H(CH_3)_2SiO]_3Si(CH_2)_3OOCC(CH_3)=CH_2$.

5. The process of claim 2 wherein the compound is $$[(CH_3)_3SiO]_2\underset{\underset{CH_3}{|}}{Si}(CH_2)_3OOCC(CH_3)=CH_2$$

6. The process of claim 2 wherein the compound is $[(CH_3)_3SiO]_3Si(CH_2)_3OOCCH=CH_2$.

7. The process of claim 1 wherein the substrate is a fibrous substrate.

8. The process of claim 7 wherein the substrate is a fabric.

9. The process of claim 8 wherein the compound is $[(CH_3)_3SiO]_3Si(CH_2)_3OOCC(CH_3)=CH_2$.

10. The process of claim 8 wherein the compound is $[H(CH_3)_2SiO]_3Si(CH_2)_3OOCC(CH_3)=CH_2$.

11. The process of claim 8 wherein the compound is $[CF_3CH_2CH_2(CH_3)_2SiO]_3Si(CH_2)_3OOCC(CH_3)=CH_2$.

12. The process of claim 8 wherein the compound is $$[(CH_3)_3SiO]_2\underset{\underset{CH_3}{|}}{Si}(CH_2)_3OOCC(CH_3)=CH_2$$

13. The process of claim 8 wherein the compound is $$[H(CH_3)_2SiO]_2\underset{\underset{CH_3}{|}}{Si}(CH_2)_3OOCC(CH_3)=CH_2$$

14. The process of claim 8 wherein the compound is $$[CF_3CH_2CH_2(CH_3)_2SiO]_2\underset{\underset{CH_2CH_2CF_3}{|}}{Si}(CH_2)_3OOCC(CH_3)=CH_2$$

15. The process of claim 8 wherein the compound is $[(CH_3)_3SiO]_3Si(CH_2)_3OOCCH=CH_2$.

16. The process of claim 8 wherein the compound is [H(CH$_3$)$_2$SiO]$_3$Si(CH$_2$)$_3$OOCCH=CH$_2$.

17. The process of claim 8 wherein the compound is [CF$_3$CH$_2$CH$_2$(CH$_3$)$_2$SiO]$_3$Si(CH$_2$)$_3$OOCCH=CH$_2$.

18. The process of claim 8 wherein the compound is

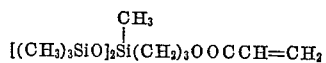
[(CH$_3$)$_3$SiO]$_2$Si(CH$_2$)$_3$OOCCH=CH$_2$

19. The process of claim 8 wherein the compound is

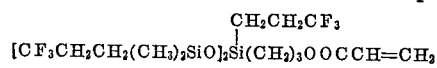
[CF$_3$CH$_2$CH$_2$(CH$_3$)$_2$SiO]$_2$Si(CH$_2$)$_3$OOCCH=CH$_2$

References Cited

UNITED STATES PATENTS

| | | | |
|---|---|---|---|
| 2,793,223 | 5/1957 | Merker. | |
| 2,917,530 | 12/1959 | Bailey | 260—46.5 X |
| 3,317,369 | 5/1967 | Clark et al. | |
| 3,324,079 | 6/1967 | Spalding | 117—161 |

ALFRED L. LEAVITT, *Primary Examiner.*

H. COHEN, *Assistant Examiner.*